United States Patent Office 3,173,835
Patented Mar. 16, 1965

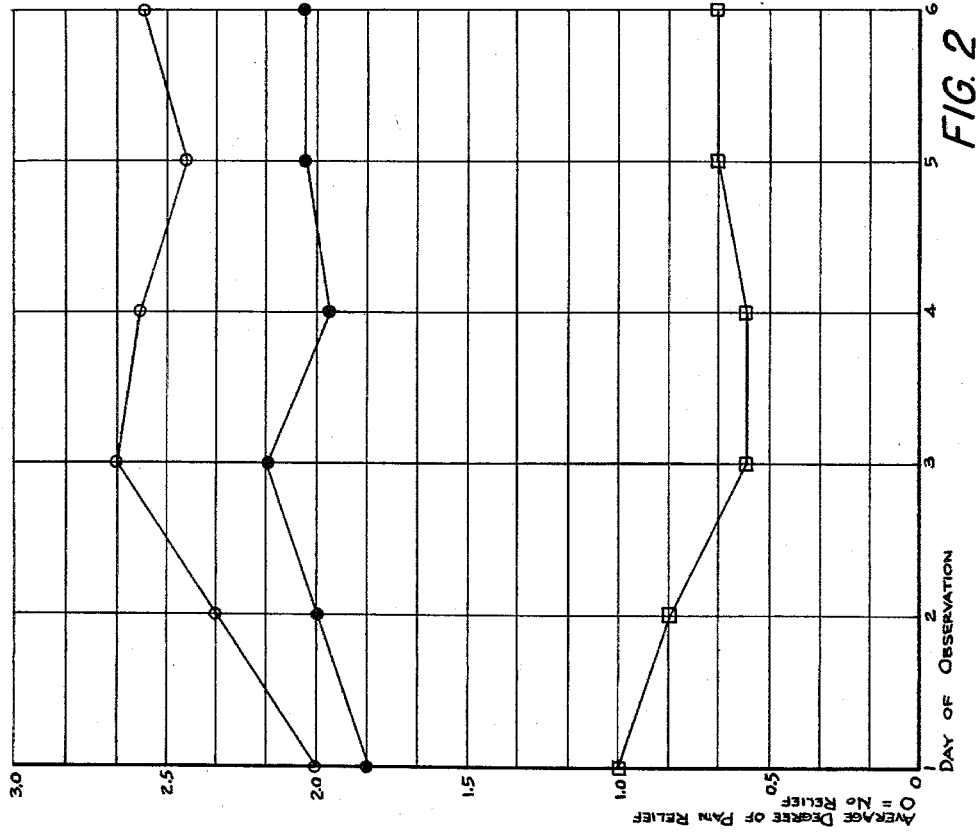
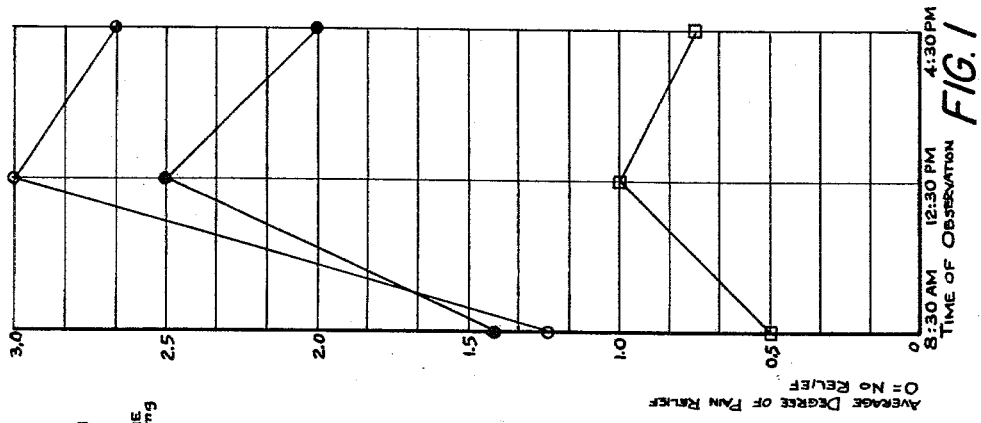

3,173,835
COMPOSITION OF N-ACETYL-p-AMINOPHENOL AND PHENYLTOLOXAMINE FOR ANALGESIA
Nathan Weiner, Forest Hills, and Harold Breslow, Wantagh, N.Y., assignors to Endo Laboratories Inc., Richmond Hill, N.Y., a corporation of New York
Filed Mar. 19, 1963, Ser. No. 266,282
7 Claims. (Cl. 167—55)

This invention relates to analgesic-antipyretic compositions. More particularly, it is directed to such compositions which consist essentially of N-acetyl-p-aminophenol (APAP) and a potentiating substance.

In consequence of extensive studies on the metabolic fate of acetanilid and acetophenetidin (phenacetin), it had been found that the major metabolite of those two substances is APAP; and that the useful antipyretic-analgesic effects were due to APAP, per se.

It has also been known that the administration of phenacetin and acetanilid sometimes results in methemoglobinemia.

APAP is devoid of that undesirable side effect. Accordingly, APAP has arrested the attention of pharmaceutical scientists; and is being utilized for its analgesic-antipyretic effect. An additional advantage of APAP is that, as contrasted with acetylsalicylic acid (aspirin), it is much more stable to hydrolysis and decomposition; and is, therefore, useful in cases where aspirin tends to cause gastric irritation because of its acidic nature, either per se or in consequence of the hydrolysis which results in the splitting off of the acetyl moiety from the molecule.

A further advantage of APAP arises when it is administered to persons suffering from thrombophlebitis, acute myocardial infarctions and other conditions involving abnormal vascular clotting. Such persons are often placed on an anticoagulant regimen to prevent recurrences and aggravation of those conditions. Many therapeutic substances, including salicylates, have a profound effect on the prothrombin time.

Accordingly, an analgesic-antipyretic which does not affect the prothrombin time is desired.

It has now been found that the activity of APAP can be potentiated by phenyltoloxamine [N,N-dimethyl-2-(α-phenyl-o-toloxy) ethylamine or 2-benzyl-phenyl-β-dimethylaminoethylether; see The Merck Index of Chemicals and Drugs, 7th edition, page 806, col. 2 item 2].

Initially, it had been found that phenyltoloxamine was an antihistamine for local and generalized allergic reactions. Later investigations have resulted in the finding that it is useful for daytime sedation or tranquilization and control of anxiety states.

In the investigations which led to the present invention, it was found that the combination of APAP and phenyltoloxamine resulted in a surprising potentiation of the analgesic-antipyretic effect of the APAP.

In an extensive clinical investigation wherein the aforesaid combinations was administered in dosages of 32 mg. of APAP and 17.72 mg. of phenyltoloxamine in the form of suitable tablets, prepared in accordance with customary pharmaceutical procedures) [the phenyltoloxamine being present as the citrate (30 mg. of this salt)], it was found that not only was there no affect on the prothrombine time of persons an on anticoagulation regimen; but, as compared with controls to whom APAP alone was administered, the combination of the APAP and the phenyltoloxamine produced results which evidenced the potentiating effects of the phenyltoloxamine.

In the pre-clinical studies on animals, it had been found (using the method of Randall-Selitto) that phenyltoloxamine potentiated the analgesic-antipyretic effect of APAP.

In carrying out the method of Randall-Selitto, male rats, weighing approximately 150 grams, were given an injection of 0.1 ml. of a 10% suspension of brewer's yeast in the plantar surface of one of the hind legs (the right hind foot). Immediately thereafter, the animals were given oral doses of the compositions whose effectiveness was being compared.

A control group of animals injected only with 10% brewer's yeast in the foot was tested in parallel to the composition(s) treated animals.

This method measures aspirin-like analgesia and anti-inflammatory action. The analgesia is measured by applying pressure with a blunted wooden peg to the injected foot. The pressure as applied at an evenly increasing rate until the animals feel pain as is observed by their withdrawal of the foot and/or crying. The pressure applied is measured with a manometer and the end point recorded. Measurements are made at one-half hour intervals until analgesia ceases.

It was also observed that the inflamed foot became more inflamed and more edematous during the observation, an effect which tends to depress the analgesic action.

In a clinical investigation, the following (in tablet form) were used:

Tablet No. 1: Placebo.
Tablet No. 2: APAP.
Tablet No. 3: APAP and phenyltoloxamine (as the citrate).

Comparable tablets were employed in the study.

Tablet No. 2 contained 325 mg. of APAP. Tablet No. 3 contained 325 mg. of APAP plus 17.72 mg. of phenyltoloxamine (30 mg.. of the citrate). The dosage was two tablets q.i.d., 7 a.m., 11 a.m. 3 p.m., and 7 p.m. for a period of six days. No tablets were given on the seventh day (Sunday) in order to prevent the carry-over effect of a more active composition from initially influencing a less active one.

The subjects were then randomly rotated to a second composition for another six day period. A total of 36 adult male subjects, having symptoms of chronic moderate pain of various etiologis were used. Observations were made at 8:30 a.m., 12:30 p.m., and 4:30 p.m., i.e., approximately 1½ hours after the administration of the substance (each day of the 6 day administration). No observations were made on the seventh day (Sunday). For each observation, the subject's relief from pain was recorded on observation cards, the format of which facilitated statistical analysis of the data obtained. A subject's relief from pain was evaluated according to the following scale:

0=No relief
1=Very slight relief
2=Moderate relief
3=Almost complete relief
4=Complete relief.

In the accompanying drawing, FIGURE 1 shows graphs indicating the average degree of relief from pain at the end of 90 minutes after each of the first three daily administrations.

In the accompanying drawing, FIGURE 2 shows graphs indicating the average degree of relief from pain for each day of the entire observation period of six days.

The potentiating effect of the phenyltoloxamine on the APAP is obtained when the phenyltoloxamine:APAP ratio is in the range of 4.5 to 12.5 parts of phenyltoloxamine to 100 parts by weight of APAP, the preferred gravimetric proportions of APAP:phenyltoloxamine being 100:5.5.

The combination of APAP and phenyltoloxamine can be made up with diluents such as sucrose, lactose, starch; lubricating agents such as magnesium stearate, stearic acid; disintegrating agents such as Amberlite XE–88 ion exchange resin (Rohm and Haas, a micronized polymerized methacrylic carboxylic acid resin whereof about 50% of the carboxyl groups are in the potassium form and the remainder in the free hydrogen form), pregelatinized starches, alginic acid, guar gums, glidants such as Cab-O-Sil (amorphous silica dioxide), for most solid dosage forms according to the methods known to the art.

Similarly, liquid dosage forms can be made up utilizing solvents such as glycerin, propylene glycol, polyethylene glycols, alcohol, and water together with bodying agents such as sucrose, sorbitol, fructose, dextrose, invert sugar, corn syrup, etc. To these liquid formulations can be added citric acid, adipic acid, hexamic acid, tartaric acid, and other acid components for pH adjustment and solubilization. Finally flavors are added for palatability and patient acceptance. Here again, formulation methods are employed which are well known to the pharmaceutical art.

It will be understood, of course, that the phenyltoloxamine (a nitrogenous base) may be incorporated in the potentiated products in the form of a salt thereof to provide the stoichiometric requisite potentiating proportion of the base, with any of the pharmaceutically acceptable acids well known to those skilled in the art of medicinal chemistry or pharmaceuticals.

Extensive reviews of scientific investigations on APAP are to be found in Technical Bulletin No. 315, entitled "N-Acetyl-p-Aminophenol, Acetaminophen, N.E., APAP," published by Abbott Laboratories, Chemical Marketing Division, North Chicago, Illinois, U.S.A., and Technical Bulletin No. 7–152 published by Miles Chemical Company division of Miles Laboratories, Inc., Elkhart, Indiana, entitled "APAP."

The following are a preparation of APAP, per se, and examples in accordance with this invention.

PREPARATION I

Tablets of APAP alone were prepared according to the following composition:

| Ingredients: | Mg./tablet |
|---|---|
| APAP | 325 |
| Lactose USP | 75 |
| Starch USP | 90 |
| Magnesium stearate USP | 3 |
| Stearic acid USP | 10 |
| Flavor | q.s. |

These tablets were granulated with starch paste according to the method known to the art. They were dried, passed through No. 20 mesh sieve, and compressed on a suitable tablet press using a 15/32" bi-concave punch at a weight of 503 mg.

Example 1

Tablets of APAP and phenyltoloxamine citrate were prepared according to the following composition:

| Ingredients: | Mg./tablet |
|---|---|
| APAP | 325 |
| Phenyltoloxamine citrate | 30 |
| Starch USP | 60 |
| Lactose | 75 |
| Magnesium stearate USP | 3 |
| Stearic acid USP | 10 |
| Flavor | q.s. |

The tablets were prepared as described in Preparation I, and compressed at the weight of 503 mg.

Example 2

| Ingredients: | Mg./tablet |
|---|---|
| APAP | 240 |
| Phenyltoloxamine citrate | 30 |
| Starch USP | 160 |
| Lactose USP | 60 |
| Magnesium stearate USP | 3 |
| Stearic acid USP | 10 |
| Flavor | q.s. |

The tablets were prepared as described in Example 1.

In accordance with the method described in Example 1, there were prepared:

Example 3

| Ingredients: | Mg./tablet |
|---|---|
| APAP | 325 |
| Phenyltoloxamine citrate | 20 |
| Starch | 70 |
| Lactose | 75 |
| Magnesium stearate USP | 3 |
| Stearic acid USP | 10 |
| Flavor | q.s. |

Example 4

| Ingredients: | |
|---|---|
| APAP | 240 |
| Phenyltoloxamine citrate | 50 |
| Starch USP | 140 |
| Lactose USP | 60 |
| Magnesium stearate USP | 3 |
| Stearic acid USP | 10 |
| Flavor | q.s. |

Example 5

| Ingredients: | |
|---|---|
| APAP | 325 |
| Phenyltoloxamine citrate | 60 |
| Lactose USP | 45 |
| Starch USP | 60 |
| Magnesium stearate USP | 3 |
| Stearic acid USP | 10 |
| Flavor | q.s. |

Example 6

Capsules of APAP and phenyltoloxamine citrate were prepared as follows:

| Ingredients: | mg./capsule |
|---|---|
| APAP | 325 |
| Phenyltoloxamine citrate | 30 |
| Lactose, spray dried, USP | 200 |
| Magnesium stearate | 1 |
| Cab-O-Sil (amorphous silica dioxide) | 5 |
| Flavor | q.s. |

These ingredients were combined, blended and passed through No. 1 screen of a Fitzpatrick comminutor machine before capsulating with a two-piece hard gelatin No. 0 capsule on a standard capsulating machine. The ratios of APAP and phenyltoloxamine were also varied as per Examples 2, 3, 4 and 5.

Example 7

An elixir of APAP and phenyltoloxamine citrate was prepared according to the following composition:

| Ingredients: | mg./5 cc. |
|---|---|
| APAP | 120 |
| Phenyltoloxamine citrate | 10 |
| Glycerin USP | [1] 40 |
| 70% Sorbo solution USP | [2] 30 |
| Liquid sugar 67° Brix | [2] 30 |
| Purified water USP | q.s. |
| Flavor | q.s. |
| Alcohol | [2] 8 |

[1] Percent w./v.
[2] Percent v./v.

Example 8

| Ingredients: | mg./5 cc. |
|---|---|
| APAP | 120 |
| Phenyltoloxamine citrate | 20 |
| Glycerin USP | [1] 40 |
| 70% Sorbo solution USP | [2] 30 |
| Liquid sugar 67° Brix | [2] 30 |
| Purified water USP | q.s. |
| Flavor | q.s. |
| Alcohol | [2] 8 |

[1] Percent w./v.
[2] Percent v./v.

Ratios of APAP and phenyltoloxamine were varied as per Examples 2, 3, 4 and 5.

It will be understood that the foregoing description of the invention and the examples set forth are merely illustrative of the principles thereof. Accordingly, the appended claims are to be construed as defining the invention within the full spirit and scope thereof.

We claim:

1. An analgesic composition for oral use consisting essentially of a pharmaceutically acceptable carrier and the analgesic consisting essentially of N-acetyl-p-aminophenol and phenyltoloxamine in the respective gravimetric proportions of 100:5.5, the phenyltoloxamine being present as a member of the group consisting of the free base and the pharmaceutically acceptable acid addition salts thereof.

2. An analgesic composition for oral use consisting essentially of a pharmaceutically acceptable carrier and the analgesic consisting essentially of N-acetyl-p-aminophenol and phenyltoloxamine in the respective gravimetric proportions of 100:4.5 to 12.5, the phenyltoloxamine being present as a member of the group consisting of the free base and the pharmaceutically acceptable acid addition salts thereof.

3. A pharmaceutical composition in accordance with claim 2 wherein the phenyltoloxamine is present as the dihydrogen citrate.

4. Method of potentiating the analgesic effect of N-acetyl-p-aminophenol which consists in orally administering the N-acetyl-p-aminophenol in admixture with phenyltoloxamine in the respective gravimetric proportions of 100:4.5 to 12.5, the phenyltoloxamine being present as a member of the group consisting of the free base and the pharmaceutically acceptable acid addition salts thereof.

5. Method of potentiating the analgesic effect of N-acetyl-p-aminophenol which consists in orally administering the N-acetyl-p-aminophenol in admixture with phenyltoloxamine in the respective gravimetric proportions of 100:5.5, the phenyltoloxamine being present as a member of the group consisting of the free base and the pharmaceutically acceptable acid addition salts thereof.

6. Method in accordance with claim 4 wherein the phenyltoloxamine is present as the dihydrogen citrate.

7. Method in accordance with claim 5 wherein the phenyltoloxamine is present as the dihydrogen citrate.

References Cited in the file of this patent

Merck Index, 7th ed., 1960, pp. 537–538 and p. 806, P.O.S.L.

Flinn: J. Pharm, Exper. Therap., vol. 94, September 1948, pp. 76–77.

Wilson: American Drug Index, J. B. Lippincott Co., 1962, RS–355–W5, pp. 11–12.